May 4, 1965

F. J. POTTER 3,182,258

TEST METHOD FOR MEASURING THE FORWARD
DYNAMIC TIME CONSTANT OF DIODES

Filed Oct. 23, 1961

INVENTOR.
FRANK J. POTTER

BY

ATTORNEY

United States Patent Office 3,182,258
Patented May 4, 1965

3,182,258
TEST METHOD FOR MEASURING THE FORWARD DYNAMIC TIME CONSTANT OF DIODES
Frank J. Potter, Penfield, N.Y., assignor to General Dynamics Corporation, Rochester, N.Y., a corporation of Delaware
Filed Oct. 23, 1961, Ser. No. 146,759
1 Claim. (Cl. 324—158)

The present invention relates to diode testing circuitry.

Past techniques for specifying semiconductors for switching service have ben unsatisfactory because the semiconductor device itself was ignored and only the output signal of the circuit including the device was considered. It is desired in circuit design work to completely define the switching parameters of the semiconductor devices themselves rather than to describe the characteristics of the devices in terms of particular circuits since these circuits vary widely for different applications. One characteristic which is necessary to define the switching parameters of diodes has been called the forward recovery time, or the forward dynamic time constant, which may be obtained by measuring the time it takes the forward voltage-drop across the diode to reach a predetermined level when a step function of current is applied to the device. It has ben found that when a diode passes a given forward steady state current a charge is stored within the diode proportional to this current. The ratio of this charge to the forward current is constant and may be designated as the forward dynamic time constant.

Accordingly, it is the principal object of the present invention to provide a new and improved test circuit for readily measuring the forward recovery time or the forward dynamic time constant of diodes on a mass production basis, if desired.

Further objects and advantages of the invention will become apparent as the following description proceeds, and the features of novelty which characterize the invention will be pointed out with particularity in the claims annexed to and forming a part of this specification.

Figure 1:
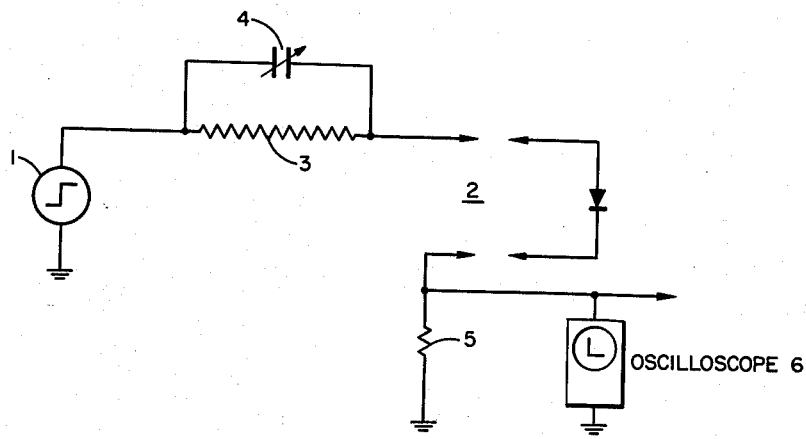
Figure 2:
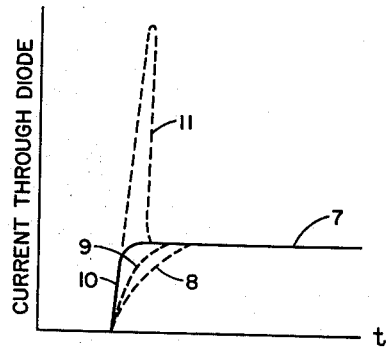

For a better understanding of the invention, reference may be had to the accompanying drawing in which:

FIG. 1 discloses a preferred embodiment of the test circuit of the present invention; and FIG. 2 graphically discloses the current flow through the diode under test for various conditions.

In accordance with the present invention, a step function, or pulse generator 1 is coupled to a pair of test terminals 2, through current limiting resistor 3, adjustable capacitor 4, and current sensing resistor 5, as shown in FIG. 1. The diode to be tested is connected across the test terminals in any convenient manner provided that the correct polarity is observed. The impedance of resistor 3 is relatively high compared to the impedance of resistor 5 so that most of the voltage drop during the steady state "on" condition is produced across resistor 3. An oscilloscope 6 may be connected across the output terminals, as shown, so that traces are produced on the face of the oscilloscope screen which are indicative of the current flow through the diode immediately after the step is generated by source 1. In order to perform the requisite test, a number of step functions must be produced by source 1. Since it is not of interest to observe the current flow through the diode after the trailing edge is produced by the pulses emanating from source 1, conventional means could be provided for blanking out these signals so that they do not appear on the oscilloscope screen. Such circuitry could be controlled by the trailing edges, as is well known in the art. The forward dynamic time constant $\tau_f$ is equal to the ratio of the injected charge to the forward current. Capacitor 4 is adjusted, as will be explained hereinafter, so that the charge in the capacitor $Q_c$ is equal to the injected charge $Q_d$ stored in the diode for a given forward current $I_f$.

$$Q_c = C(V_{in} - V_L)$$

where $V_{in}$ is the voltage produced by pulse generator 1, C is the capacitance of capacitor 4, and $V_L$ equals the sum of the voltage drops across the diode and resistor 5; also $$I_f = \frac{(V_{in} - V_L)}{R_3}$$

where $R_3$ is the resistance of resistor 3. Therefore, $$\tau_f = \frac{Q_c}{I_f} = \frac{C(V_{in} - V_L)}{\frac{(V_{in} - V_L)}{R_3}} = CR_3$$

Since $R_3$ is a known constant, the setting of the adjustable capacitor may be calibrated to directly indicate $\tau_f$.

The capacitor is adjusted so that the charge in the capacitor $Q_c$ is equal to the charge stored in the diode $Q_d$ as set forth herein below. In the absence of capacitor 4, the current through the diode would rise to the steady state level 7, shown in FIG. 2. This rise could be represented by line 8, shown in the figure. In other words, the circuit would behave in the same manner, just after the application of the leading edge of a pulse produced by source 1, as an R-C circuit since the diode must store a charge before the steady state level 7 is reached. Where the value of adjustable capacitor 4 is small, a curve, such as 9, may be produced on the screen of the oscilloscope 6. In other words, the insertion of a small capacitance across resistor 3 would speed up the insertion of the charge in the diode somewhat but before this charge reaches the required value, the capacitor 4 would be fully charged and the remaining current to complete the storage charge would have to flow through resistor 3 which would take a greater time than would be required to charge the diode where capacitor 4 is larger. Therefore, as the capacitance of capacitor 4 is increased, the charge curve will approach curve 10, shown in FIG. 2. At this adjustment, the capacitor and diode both reach their conduition of maximum charge together and the charge in capacitor 4 is equal to the injected charge stored in the diode under test. Where the capacitance of capacitor 4 is increased beyond this point, a curve, such as 11, will be produced on the face of the oscilloscope 6. This curve will be produced because current continues to flow through capacitor 4 after the full injected charge is inserted in the diode so that the full voltage of pulse generator 1 is present across the series circuit, which comprises the diode and current sensing resistor 5. A short time thereafter, the capacitor will be fully charged so that current must now flow through resistor 3 which, in turn, sharply reduces the voltage applied across the aforementioned series circuit and, accordingly, reduces the current flow through the diode to the level 7.

Accordingly, the greater the forward dynamic time constant of the diode under test the greater the capacity of capacitor 4 necessary to produce curve 10 of FIG. 2 and, conversely, the less the forward time constant of the diode under test the less the capacity of capacitor 4 necessary to produce the curve 10. Therefore, an unskilled operator by merely adjusting capacitor 4 can determine the forward dynamic time constant of the diode under test since this constant is proportional to the setting of the capacitor, as shown hereinabove. Generally speaking, $\tau_f$ should not exceed a given value for a particular batch of diodes to be tested, and thus an appropriate setting of capacitor 4 would be made by the operator and the production of the overshoot pip 11 would indicate that the particular diode under test has a $\tau_f$ which is smaller than this tolerable value and, therefore, passes the test. If a diode has a $\tau_f$ greater than this tolerable value, a curve such as 8 or 9 will be produced instead of an overshoot pip 11. Therefore, an unskilled operator need merely look for pip 11 to pass the diode under test. My invention is, therefore, conducive to high speed testing.

While there has been disclosed what is at present considered to be the preferred embodiment of the invention, other modifications will readily occur to those skilled in the art. It is not, therefore, desired that the invention be limited to the specific arrangement shown and described, and it is intended in the appended claim to cover all such modifications as fall within the true spirit and scope of the invention.

What is claimed is:

A process for measuring the forward dynamic time constant of a diode comprising the steps of causing said diode to conduct by applying the leading edge of a pulse to said diode, whose forward dynamic time constant is to be measured, through a circuit including a resistor and an adjustable capacitor connected in parallel, sensing the current flow through said diode produced by said pulse, and adjusting said capacitor to cause said current flow to assume a steady state value without exceeding said steady state value in the shortest possible time after the occurrence of the leading edge of said pulse.

References Cited by the Examiner

"Switching Circuits: Measuring Recovery Time," Electronic Design, November 11, 1959, pp. 199–203.

WALTER L. CARLSON, *Primary Examiner.*

FREDERICK M. STRADER, *Examiner.*